United States Patent
Negoro et al.

(10) Patent No.: US 9,322,707 B2
(45) Date of Patent: Apr. 26, 2016

(54) METHOD FOR MEASURING LUMINANCE OF LIGHT-EMITTING DISPLAY PANEL

(71) Applicant: JOLED INC., Tokyo (JP)

(72) Inventors: Yasunori Negoro, Hyogo (JP); Yasuo Segawa, Hyogo (JP)

(73) Assignee: JOLED INC., Tokyo (JP)

( * ) Notice: Subject to any disclaimer, the term of this patent is extended or adjusted under 35 U.S.C. 154(b) by 471 days.

(21) Appl. No.: 13/688,352

(22) Filed: Nov. 29, 2012

(65) Prior Publication Data

US 2013/0088589 A1 Apr. 11, 2013

Related U.S. Application Data

(63) Continuation of application No. PCT/JP2010/003744, filed on Jun. 4, 2010.

(51) Int. Cl.
*G01J 1/04* (2006.01)
*G01J 1/42* (2006.01)
(Continued)

(52) U.S. Cl.
CPC .... *G01J 1/42* (2013.01); *G01J 1/04* (2013.01); *G01J 1/0411* (2013.01); *G01J 1/4228* (2013.01); *G01M 11/02* (2013.01); *H01J 9/42* (2013.01); *H01J 11/00* (2013.01); *G02F 1/1309* (2013.01)

(58) Field of Classification Search
CPC .......... G01J 1/04; G01J 1/0411; G01J 1/4228
USPC .......................................... 348/135; 382/141
See application file for complete search history.

(56) References Cited

U.S. PATENT DOCUMENTS

| 5,081,687 A * | 1/1992 | Henley ................. G01R 31/316 345/87 |
| RE37,847 E | 9/2002 | Henley et al. |
| 2004/0213449 A1 * | 10/2004 | Safaee-Rad ........... G06T 7/0004 382/141 |

FOREIGN PATENT DOCUMENTS

| JP | 06-026988 | 2/1994 |
| JP | 06-222316 | 8/1994 |

(Continued)

OTHER PUBLICATIONS

Jai, Camera Sensitivity Explained, May 30, 2007, retrieved Jan. 16, 2015.*

(Continued)

*Primary Examiner* — Tung Vo
*Assistant Examiner* — Rowina Cattungal
(74) *Attorney, Agent, or Firm* — Greenblum & Bernstein, P.L.C.

(57) ABSTRACT

Disclosed is a method for measuring luminance of each of entire pixels two-dimensionally arranged in a light-emitting display panel at regular intervals, using an image sensor in which light receiving elements are two-dimensionally arranged at regular intervals, the method including: providing an optical lens between the light-emitting display panel and the image sensor, and adjusting distances between the light-emitting display panel, the image sensor, and the optical lens by setting intervals of images of the entire pixels to be N times as large as intervals of the light receiving pixels, where N is a natural number, the images being to be formed on a light receiving surface of the image sensor through the optical lens; displaying, on the light-emitting display panel, a display pattern in which predetermined pixels from among the entire pixels produce a luminescence; and measuring the luminance of the predetermined pixels, using the light receiving elements.

12 Claims, 8 Drawing Sheets

(51) Int. Cl.
 *H01J 9/42* (2006.01)
 *H01J 11/00* (2012.01)
 *G01M 11/02* (2006.01)
 *G02F 1/13* (2006.01)

(56) References Cited

FOREIGN PATENT DOCUMENTS

| JP | 07-083799 | 3/1995 |
|----|-----------|--------|
| JP | 07-146211 | 6/1995 |
| JP | 08-178797 | 7/1996 |
| JP | 10-281932 | 10/1998 |
| JP | 2001-281166 | 10/2001 |
| JP | 2004-294289 | 10/2004 |
| JP | 2006-234414 | 9/2006 |
| JP | 2007-279213 | 10/2007 |
| JP | 2009-156704 | 7/2009 |

OTHER PUBLICATIONS

Japan Office action, mail date is Apr. 8, 2014.
International Search Report and Written Opinion for PCT/JP2010/003744, dated Aug. 24, 2010 along with an english translation of ISR.

* cited by examiner

$(2N)^2$ light receiving pixels

FIG. 8A
Horizontal stripe

FIG. 8B
Checkered

FIG. 8C
Dot

FIG. 8D
Vertical stripe

FIG. 9

METHOD FOR MEASURING LUMINANCE OF LIGHT-EMITTING DISPLAY PANEL

CROSS REFERENCE TO RELATED APPLICATION

This is a continuation application of PCT Patent Application No. PCT/JP2010/003744 filed on Jun. 4, 2010, designating the United States of America. The entire disclosure of the above-identified application, including the specification, drawings and claims are incorporated herein by reference in its entirety.

FIELD

One or more exemplary embodiments disclosed herein relate generally to a method for measuring luminance of a light-emitting display panel.

BACKGROUND

Conventionally, a method for measuring luminance of each pixel in a light-emitting display panel from image data obtained by capturing an image of the light-emitting display panel in which the pixels produce a luminescence according to a predetermined display pattern is known as a method for inspecting a luminescent state of the light-emitting display panel. Here, the light-emitting display panel is a display panel in which the pixels are two-dimensionally arranged, such as a liquid-crystal display panel, a plasma display panel, and an organic electroluminescence (EL) display panel.

For example, PTL 1 discloses a method for measuring luminance of each pixel, by calculating a cumulative sum of luminance values in a measurement region determined by a resolution of a camera and the number of pixels that simultaneously emit light from among the pixels included in a display panel, for each of the measurement regions.

According to this method, since the luminance of one pixel is measured by calculating a cumulative sum of the luminance values of light receiving elements included in the measurement region on which the images of the pixels are to be formed, the luminance of each of the pixels can be measured without aligning the pixels with the light receiving elements with accuracy.

Furthermore, PTL 2 discloses a method for measuring luminance of each pixel with higher accuracy by calculating a cumulative sum of luminance values excluding (i) a luminance value of a light receiving element on which an image of a black stripe portion in a display panel is to be formed and (ii) a luminance value of a light receiving element on which images of pixels are to be formed.

CITATION LIST

Patent Literature

[PTL 1] Japanese Unexamined Patent Application Publication No. 2009-156704
[PTL 2] Japanese Unexamined Patent Application Publication No. 6-222316

SUMMARY

Technical Problem

The inventors have found a problem that accuracy in a measurement result decreases according to an aperture ratio of an image sensor of a camera when luminance of each pixel of a display panel is measured using the camera.

One non-limiting and exemplary embodiment provides a method for measuring luminance of each pixel of a display panel (particularly, high-definition display panel) with ease and high accuracy using a camera.

Solution to Problem

In one general aspect, the techniques disclosed here feature a method for measuring luminance of each of entire pixels two-dimensionally arranged in a light-emitting display panel at regular intervals, using an image sensor in which light receiving elements are two-dimensionally arranged at regular intervals, the method including: providing an optical lens between the light-emitting display panel and the image sensor, and adjusting distances between the light-emitting display panel, the image sensor, and the optical lens by setting intervals of images of the entire pixels to be N times as large as intervals of the light receiving pixels, where N is a natural number, the images being to be formed on a light receiving surface of the image sensor through the optical lens; displaying, on the light-emitting display panel, a display pattern in which predetermined pixels from among the entire pixels produce a luminescence; and measuring the luminance of the predetermined pixels that produce the luminescence, using the light receiving elements, wherein in the displaying, the display pattern is a display pattern in which the predetermined pixels produce the luminescence and at least one of the entire pixels adjacent to the predetermined pixels does not produce a luminescence, and in the measuring, the luminance of each of the predetermined pixels is measured using $(2N)^2$ light receiving elements included in the light receiving elements.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The method for measuring luminance of a light-emitting display panel according to one or more exemplary embodiments or features disclosed herein enables reduction of a measurement error caused by a luminescence of a pixel adjacent to a target pixel to be measured, and accurate measurement of luminance of each pixel due to no variation in measurement condition for the pixel (specifically, areas of the light receiving elements on which each of the images of the pixels is to be formed), even when an image sensor having an aperture ratio lower than 100% is used.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

The inventors have found a problem that accuracy in a measurement result decreases according to an aperture ratio of an image sensor of a camera when luminance of each pixel of a display panel is measured using the camera.

Figure 9:
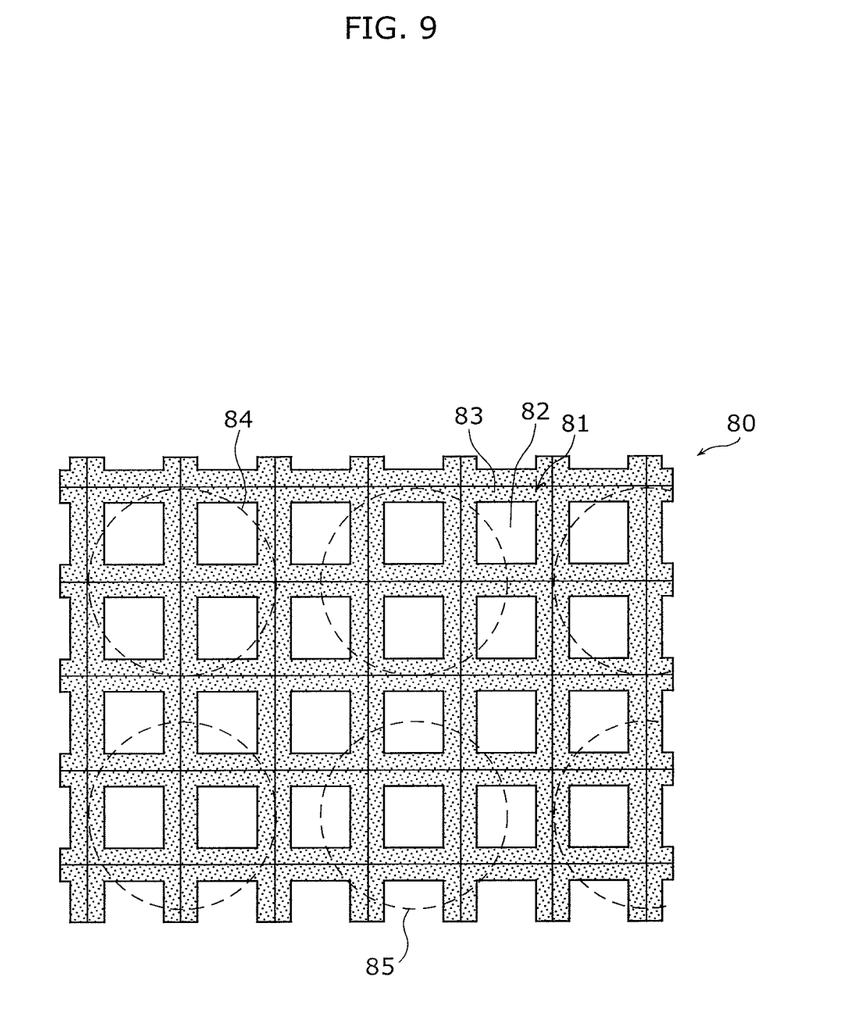
FIG. 9 illustrates a problem in a conventional method for measuring luminance.

FIG. 9 illustrates that an aperture ratio of an image sensor 80 causes an error in a measurement result of luminance. FIG. 9 schematically illustrates that images 84, 85, and others of pixels are formed on an image sensor 80 including light receiving pixels 81 that are two-dimensionally arranged. Each of the light receiving pixels 81 includes a light receiving element 82 that converts incident light into an electrical signal, and a shielding region 83 for use in transferring the obtained electrical signal. Light entering the shielding region 83 is not converted into an electrical signal. Here, an aperture ratio is defined as a ratio of an area of the light receiving element 82 to an area of the light receiving pixel 81.

For simplification, the light receiving pixel 81 is represented by a square, and an image of a pixel is represented by a circle in FIG. 9. Furthermore, a diameter of the image of one pixel is approximately double one side of the light receiving pixel 81.

Under such a circumstance, most of the images 84 of the pixels are formed on the light receiving elements 82, whereas most of the images 85 of the pixels are formed on the shielding regions 83 as illustrated in FIG. 9. Thus, an error occurs, that is, measured luminance of a pixel corresponding to the image 85 is relatively lower than luminance of a pixel corresponding to the image 84. Such an error is referred to as an error caused by influence of an aperture ratio in the Description.

As the number of light receiving pixels included in a region on which the image of one pixel is to be formed is smaller (when, for example, luminance of a high-definition display panel is measured using a low-resolution camera), the measurement conditions (specifically, areas of the light receiving elements on which each of the images of the pixels is to be formed) for each pixel are hard to be equalized. Thus, the error caused by the influence of aperture ratio frequently occurs.

Although using a camera having a higher resolution or having a higher aperture ratio of an image sensor is effective for reducing the error caused by the influence of aperture ratio, the error cannot be completely eliminated even using such a camera. Since such a camera is generally expensive, the camera is not appropriate for measuring luminance of each pixel in a display panel with ease and high accuracy.

One non-limiting and exemplary embodiment provides a method for measuring luminance of each pixel of a display panel (particularly, high-definition display panel) with ease and high accuracy using a camera.

One exemplary embodiment disclosed herein provides a method for measuring luminance of each of entire pixels two-dimensionally arranged in a light-emitting display panel at regular intervals, using an image sensor in which light receiving elements are two-dimensionally arranged at regular intervals, the method including: providing an optical lens between the light-emitting display panel and the image sensor, and adjusting distances between the light-emitting display panel, the image sensor, and the optical lens by setting intervals of images of the entire pixels to be N times as large as intervals of the light receiving pixels, where N is a natural number, the images being to be formed on a light receiving surface of the image sensor through the optical lens; displaying, on the light-emitting display panel, a display pattern in which predetermined pixels from among the entire pixels produce a luminescence; and measuring the luminance of the predetermined pixels that produce the luminescence, using the light receiving elements.

According to an exemplary embodiment disclosed herein, it is possible to reduce a measurement error caused by a luminescence of a pixel adjacent to a target pixel to be measured, and accurately measure luminance of each pixel due to no variation in measurement condition for each pixel (specifically, areas of the light receiving elements on which each of the images of the pixels is to be formed), even when an image sensor having an aperture ratio lower than 100% is used for measurement.

According to the aspect, in the displaying, the display pattern may be a display pattern in which the predetermined pixels produce the luminescence and at least one of the entire pixels adjacent to the predetermined pixels does not produce a luminescence.

According to the aspect, the entire pixels may be arranged in a matrix in the light-emitting display panel, and only one of four pixels included in the entire pixels may produce a luminescence in the display pattern, the four pixels being a first pixel arranged in an odd-numbered row and an odd-numbered column, a second pixel arranged in an even-numbered row and an odd-numbered column, a third pixel arranged in an odd-numbered row and an even-numbered column, and a fourth pixel arranged in an even-numbered row and an even-numbered column.

According to the aspect, the entire pixels may be arranged in a matrix in the light-emitting display panel, and only one of two pixels included in the entire pixels may produce a luminescence in the display pattern, the two pixels being a first pixel arranged in an odd-numbered row and a second pixel arranged in an even-numbered row.

According to the aspect, the entire pixels may be arranged in a matrix in the light-emitting display panel, and only one of two pixels included in the entire pixels may produce a luminescence in the display pattern, the two pixels being a first pixel arranged in an odd-numbered row and an odd-numbered column or an even-numbered row and an even-numbered column, and a second pixel arranged in an even-numbered row and an odd-numbered column or an odd-numbered row and an even-numbered column.

According to the aspect, the entire pixels may be arranged in a matrix in the light-emitting display panel, and only one of two pixels included in the entire pixels may produce a luminescence in the display pattern, the two pixels being a first pixel arranged in an odd-numbered column and a second pixel arranged in an even-numbered column.

In this way, it is possible to measure luminance using various specific display patterns capable of reducing the measurement error caused by a luminescence of a pixel adjacent to a target pixel to be measured.

According to the aspect, N may be one of 2, 3, and 4.

As the number of light receiving elements included in a region on which one image of a pixel is to be formed is smaller, the measurement conditions (specifically, areas of the light receiving elements on which each of the images of the pixels is to be formed) vary. In such a state, the luminance of each pixel can be accurately measured by eliminating the variation.

According to the aspect, the luminance of each of the predetermined pixels may be measured using $(2N)^2$ light receiving elements included in the light receiving elements.

In this way, luminance of one pixel is calculated by calculating a cumulative sum of luminance values in a region in which one image of the pixel is formed.

According to the aspect, each of the entire pixels may include a red sub-pixel, a green sub-pixel, and a blue sub-pixel, and in the displaying, one of the red sub-pixel, the green sub-pixel, and the blue sub-pixel may produce a luminescence.

In this way, luminance of each sub-pixel can be accurately calculated in a color light emitting display panel.

According to the aspect, the image sensor may be a charge-coupled device.

In this way, luminance of each pixel can be accurately calculated using the image sensor that is a charge-coupled device.

According to the aspect, the image sensor may have an aperture ratio of 20% or higher and lower than 100%.

In this way, luminance of each pixel can be accurately calculated using the image sensor having an aperture ratio lower than 100%.

According to the aspect, the entire pixels may include an organic electroluminescence (EL) element.

In this way, luminance of each pixel of the organic EL can display panel be accurately calculated.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

The method for measuring luminance according to Embodiment 1 will be hereinafter described in detail with reference to drawings.

Figure 1:
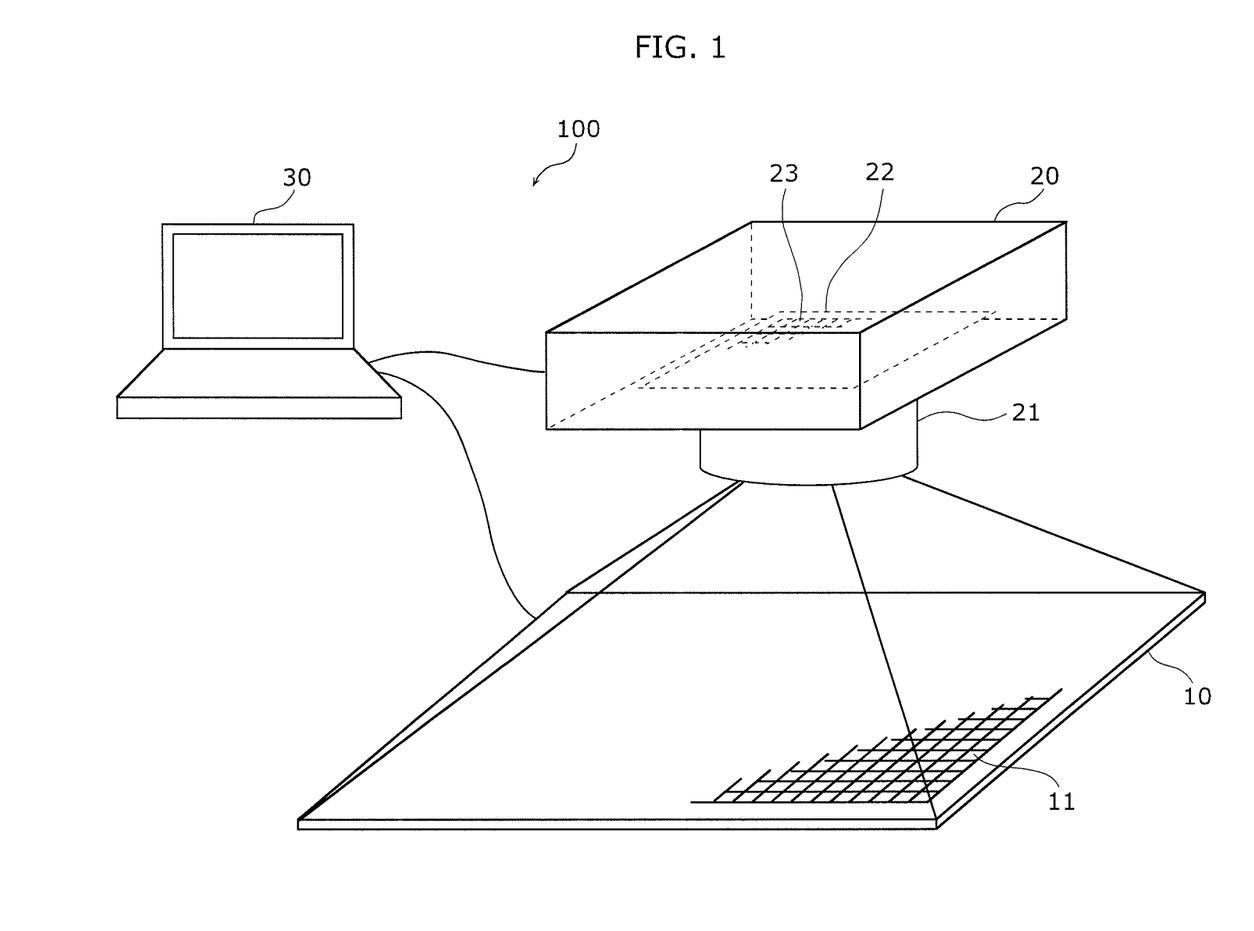
FIG. 1 is an external view illustrating a luminance measuring system that performs a luminance measuring method according to one exemplary embodiment.

FIG. 1 is an external view illustrating an example of a luminance measuring system 100 that performs a luminance measuring method according to Embodiment 1. The luminance measuring system 100 includes a light-emitting display panel 10 to be measured, a camera 20, and a controller 30.

The light-emitting display panel 10 is, for example, a liquid-crystal display panel, a plasma display panel, and an organic EL display panel, and pixels 11 capable of being individually controlling luminance are arranged two-dimensionally on the light-emitting display panel 10 at regular intervals. The pixels 11 can produce a luminescence by itself, or produce a luminescence by reflecting or transmitting light from another light source.

The camera 20 is, for example, a digital camera, and includes an optical system 21 and an image sensor 22. The optical system 21 has an optical lens and a focus mechanism, and may further have a zoom mechanism. In the image sensor 22, light receiving pixels 23 are two dimensionally arranged at regular intervals. Each of the light receiving pixels 23 includes a light receiving element having a predetermined aperture ratio.

The controller 30 is, for example, an information processing device, such as a computer system, and controls the light-emitting display panel 10 and the camera 20 to measure luminance of each of the pixels 11 of the light-emitting display panel 10.

The controller 30 is a main unit that executes the method for measuring luminance according to Embodiment 1, and at the beginning of the measurement, adjusts distances between the light-emitting display panel 10, the image sensor 22 of the camera 20, and the optical lens by setting the intervals of the images of the pixels 11 formed on the receiving surface of the image sensor 22 to be N times as large as the intervals of the light receiving pixels 23 of the image sensor 22. Here, N is a natural number.

The controller 30 can perform the adjustment by, for example, operating the zoom mechanism included in the optical system 21 of the camera 20. In this adjustment, only the magnification of the images of the pixels 11 has to be adjusted, and there is no need to consider a displacement between the images of the pixels 11 and the light receiving pixels 23. The specific method of this adjustment and the technical significance will be described in detail later.

Figure 2:
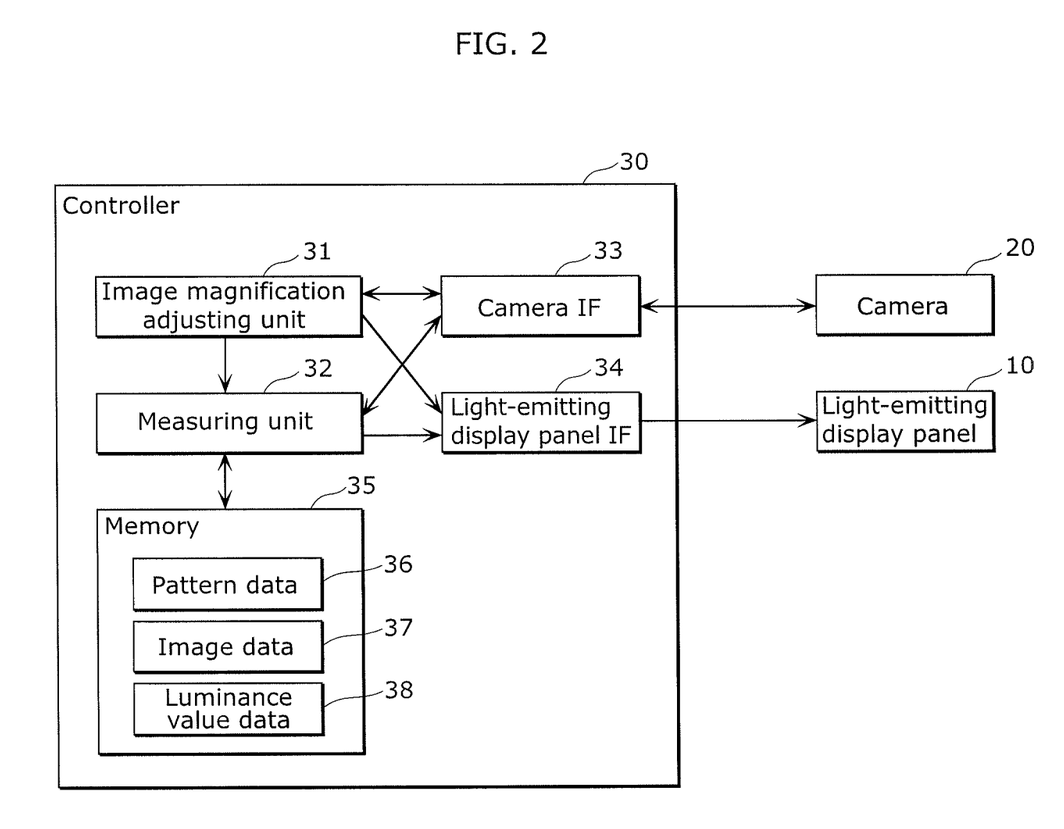
FIG. 2 is a block diagram illustrating a functional configuration of a controller.

FIG. 2 is a block diagram illustrating an example of a functional configuration of the controller 30. FIG. 2 also illustrates the light-emitting display panel 10 and the camera 20 in addition to the controller 30 for convenience of the explanation.

The controller 30 includes an image magnification adjusting unit 31, a measuring unit 32, a camera interface (IF) 33, a light-emitting display panel IF 34, and a memory 35.

Each of the image magnification adjusting unit 31 and the measuring unit 32 may have a software function fulfilled by execution of a computer program prepared in advance by a processor (not illustrated), in a computer system that implements the controller 30.

At the beginning of the measurement, the image magnification adjusting unit 31 adjusts an image magnification that is a size of the image of each of the pixels 11 on the image sensor 22.

The measuring unit 32 calculates luminance of each of the pixels 11 of the light-emitting display panel 10, using image data received from the camera 20, as main processing for measuring luminance.

The camera IF 33 is an interface for controlling the camera 20, and for example, transmits a zoom instruction signal and a capturing instruction signal to the camera 20, and receives the image data representing a result of the capturing from the camera 20.

The light-emitting display panel IF 34 is an interface for controlling the light-emitting display panel 10, and transmits pattern data indicating a display pattern, to the light-emitting display panel 10.

The memory 35 is a semiconductor memory device or a disk device, and stores pattern data 36 indicating a display pattern, image data 37 received from the camera 20, and luminance value data 38 calculated using the image data.

Next, a method for measuring luminance performed by the luminance measuring system having such a configuration will be described.

Figure 3:
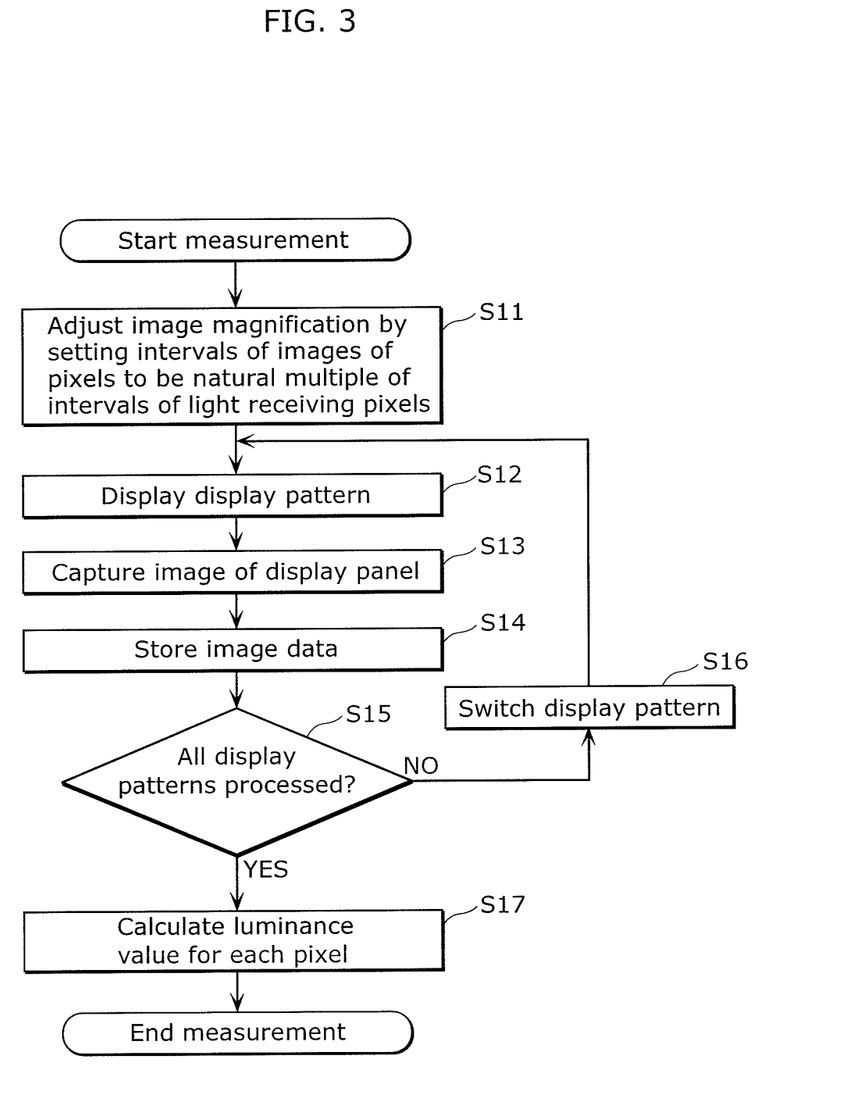
FIG. 3 is a flowchart indicating an example of a method for measuring luminance according to one exemplary embodiment.

FIG. 3 is a flowchart indicating an example of a method for measuring luminance according to Embodiment 1.

The image magnification adjusting unit 31 adjusts an image magnification that is a size of each of the images 11 of the pixels on the image sensor 22 by setting the intervals of the images of the pixels 11 formed on the receiving surface of the image sensor 22 to be N times as large as the intervals of the light receiving pixels 23 of the image sensor 22, where N is a natural number (S11). The adjustment starts from coarse adjustment of an image magnification to a target magnification and ends with fine adjustment to be described next.

The image magnification adjusting unit 31 causes the camera 20 to capture an image of the light-emitting display panel 10 in a state where all the pixels produce a luminescence, and receives the image data indicating the captured image from the camera 20.

When the intervals of the images of the pixels are not N times as large as the intervals of the light receiving pixels 23 of the image sensor 22, a periodical displacement in position between the images and the light receiving pixels 23 periodically changes areas of the light receiving elements 23 on which each of the images of the pixels is formed. As a result, moire that is a periodical light-dark pattern is observed in the captured image.

When the moire is observed in the captured image, the image magnification adjusting unit 31 changes the image magnification (specifically, distances between the light-emitting display panel 10, the image sensor 22 of the camera 20, and the optical lens included in the optical system 21) by operating the zoom mechanism of the camera 20, causes the camera 20 to capture an image of the light-emitting display panel 10 again, and checks the presence or absence of the moire in the captured image. The image magnification adjusting unit 31 accurately adjusts the intervals of the images of the pixels 11 to be N times as large as the intervals of the light receiving pixels by repeating such operations until the moire is not observed.

Figure 4:
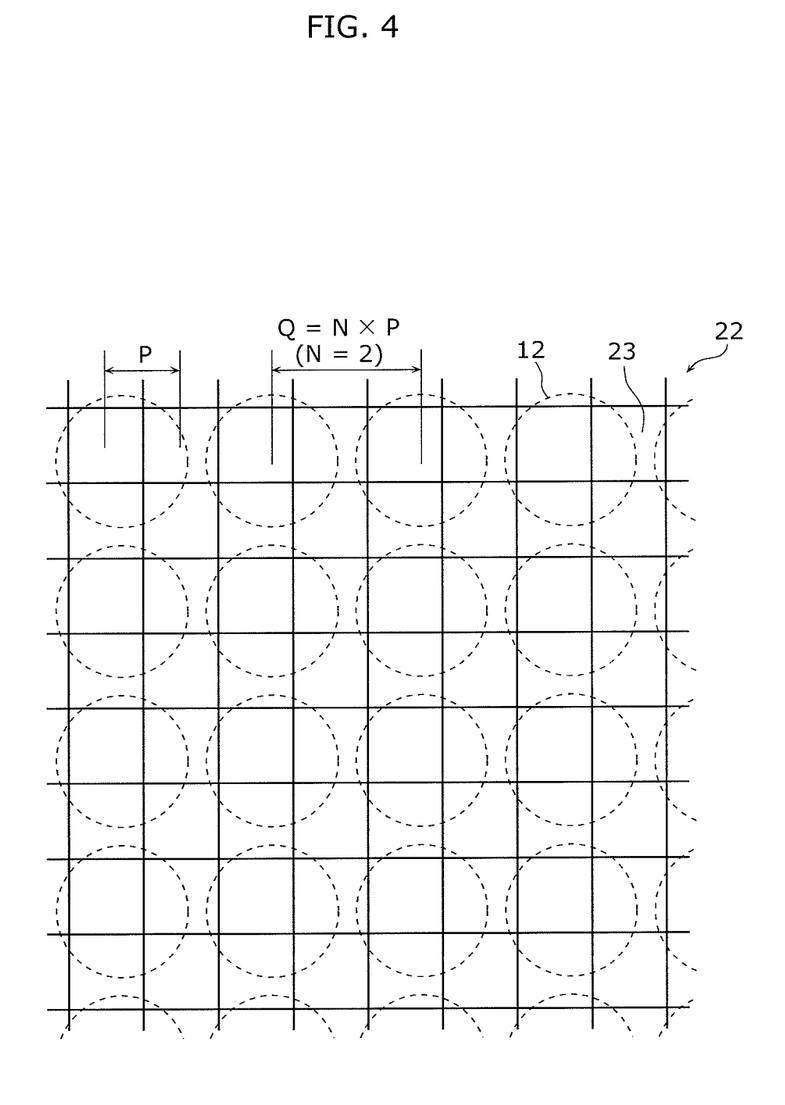
FIG. 4 illustrates an example of an alignment between light receiving pixels and images of pixels.

FIG. 4 illustrates an example of an alignment between the light receiving pixels 23 and images 12 of the pixels in a state where the image magnification is adjusted. Here, FIG. 4 illustrates the alignment when an interval Q of the images of the pixels is adjusted to be two times as large as an interval P of the light receiving pixels 23.

As such, when the alignment in which the interval Q is a natural multiple of the interval P is achieved, the measurement conditions (specifically, areas of the light receiving elements 23 on which each of the images of the pixels is formed) for all the pixels are identical. As a result, the error caused by influence of an aperture ratio when luminance of the pixels is measured is eliminated.

Here, adjustment of an image magnification that is a size of each of the images 12 of the pixels is sufficient to unify the measurement conditions for all the pixels, and there is no need to align the positions of the images 12 of the pixels with the positions of the light receiving pixels 23. Thus, the very simple operation of eliminating moire enables measurement of luminance values with high accuracy, without any error caused by influence of an aperture ratio when luminance of the pixels is measured.

Although FIG. 4 does not explicitly illustrates the detail, the intervals of the images 12 of the pixels are adjusted to be N times as large as the intervals of the light receiving pixels 23 even in the vertical direction of FIG. 4. The intervals in the vertical direction of FIG. 4 may be identical to those in the horizontal direction, and the intervals in the vertical and horizontal directions may be separately determined.

The rest of the flowchart in FIG. 3 will be described below with reference to FIG. 2.

In a state where the image magnification is adjusted, the measuring unit 32 reads the pattern data 36 indicating a display pattern from the memory 35, and transmits the read pattern data 36 to the light-emitting display panel 10. Accordingly, the light-emitting display panel 10 displays the display pattern. In other words, the pixels 11 produce or quench a luminescence according to the display pattern (S12). The display pattern for use is a pattern in which predetermined pixels produce a luminescence and at least one of pixels adjacent to the predetermined pixels does not produce a luminescence.

The camera 20 captures an image of the light-emitting display panel 10 that displays such a display pattern (S13). Then, the controller 30 receives the image data representing the captured image from the camera 20, and stores the data in the memory 35 as the image data 37 (S14). When display patterns are prepared, the same processing is repeated for each of the display patterns (No at S15, and S16).

The measuring unit 32 calculates, for each of the pixels as a luminance value, a cumulative sum of luminance values of a region including the images of the pixels, with reference to the image data 37 stored in the memory 35, and stores the luminance value data 38 indicating the calculated luminance value in the memory 35 (S17).

Figure 5:
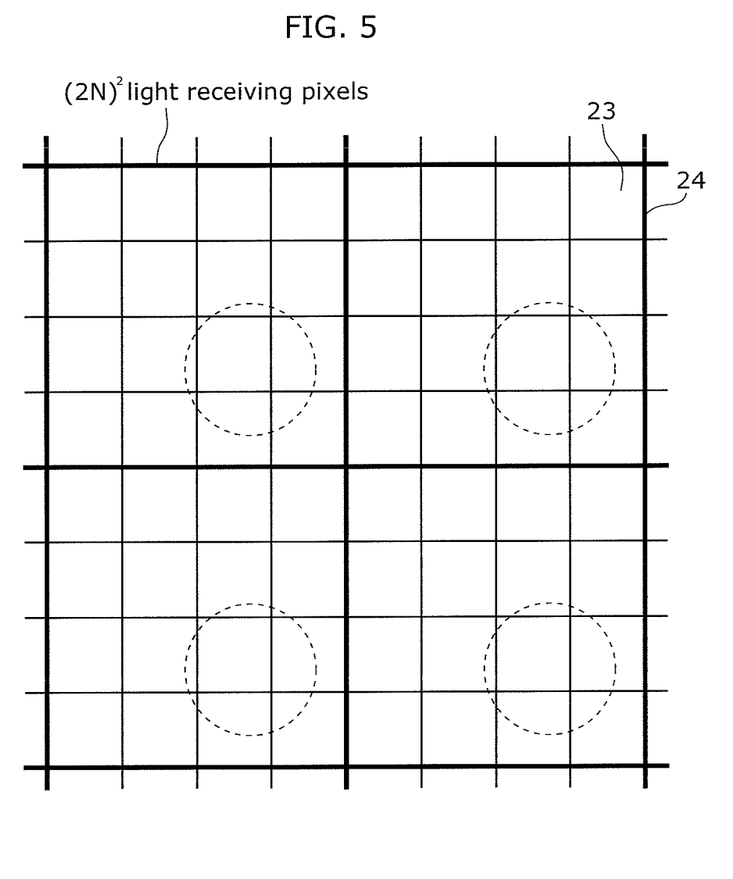
FIG. 5 illustrates a method for calculating a luminance value for each of the pixels.

FIG. 5 illustrates a method for calculating a luminance value for each of the pixels.

FIG. 5 illustrates an example of a first display pattern in which only first pixels arranged in odd-numbered rows and columns produce a luminescence in a state of the alignment of N=2 as illustrated in FIG. 4. In this example, the measuring unit 32 calculates a luminance value of one pixel by calculating a cumulative sum of luminance values in a region that is partitioned by thick lines 24 and includes the $(2N)^2=16$ light receiving pixels 23 per pixel.

Furthermore, in a state where the adjusted image magnification is maintained, the following display patterns are successively displayed on the light-emitting display panel 10, and the measuring unit 32 calculates the luminance values of all the pixels. The display patterns include: a second display pattern in which only second pixels arranged in the even-numbered rows and odd-numbered columns produce a luminescence; a third display pattern in which only third pixels arranged in the even-numbered columns and odd-numbered rows produce a luminescence; and a fourth display pattern in which only fourth pixels arranged in the even-numbered columns and rows produce a luminescence. The partitioned regions in each of which the cumulative sum of luminance values is calculated may be different for each of the display patterns. For example, the partitioned regions may be changed so that the light receiving pixels 23 having higher luminance are located at the center of each of the regions, for each of the display patterns.

Embodiment 2

Embodiment 2 is an embodiment in which the method for measuring luminance according to Embodiment 1 is applied to measurement of luminance of a color light emitting display panel. The color light emitting display panel is a display panel capable of displaying color images, and each of the pixels in the color light emitting display panel includes red, green, and blue sub-pixels.

Figure 6:
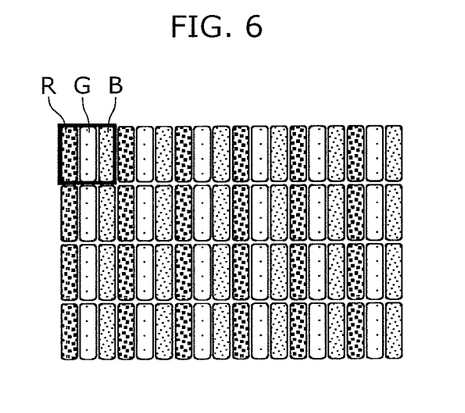
FIG. 6 illustrates an example of a typical arrangement of sub-pixels on a color light emitting display panel.

FIG. 6 illustrates an example of a typical arrangement of sub-pixels of the color light emitting display panel. Red, green, and blue sub-pixels R, G, and B form one approximately square pixel as enclosed by a thick line in FIG. 6, and the pixels are two-dimensionally arranged at regular intervals. Each of the pixels includes the red, green, and blue sub-pixels R, G, and B that are placed in the same order.

Figure 7A:
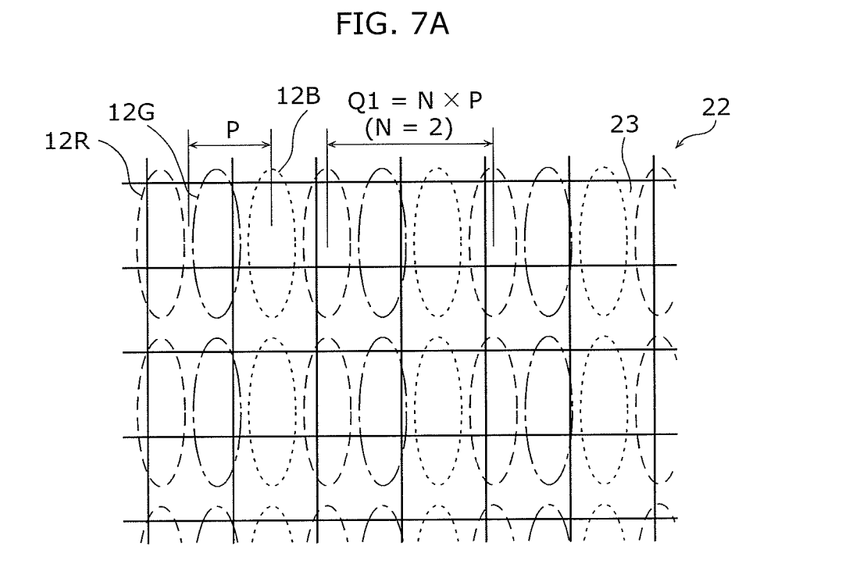
FIG. 7A illustrates an example of an alignment between light receiving pixels and images of pixels on a color light emitting display panel.
Figure 7B:
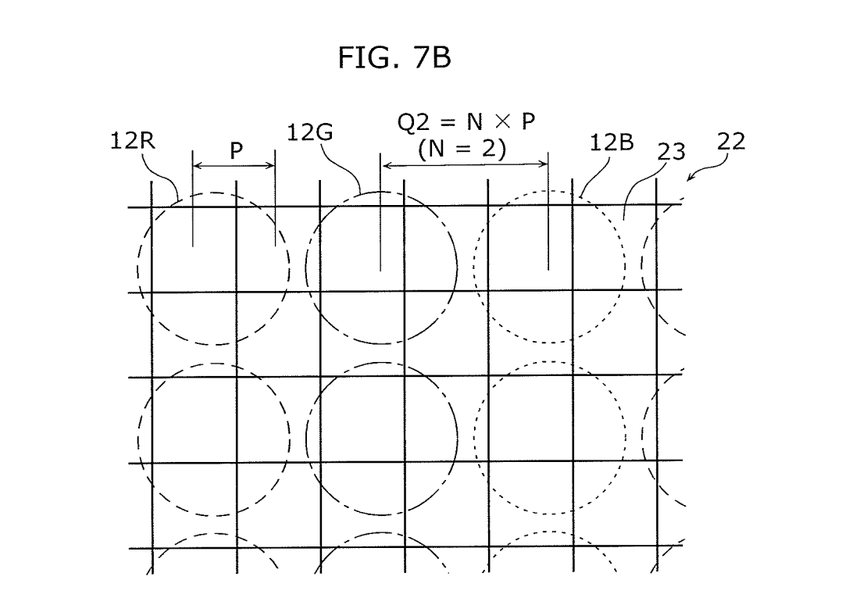
FIG. 7B illustrates an example of an alignment between light receiving pixels and images of pixels on a color light emitting display panel.

FIGS. 7A and 7B illustrate an example of an alignment between the light receiving pixels 23 and images 12R, 12G, and 12B of the red, green, and blue sub-pixels, respectively included in the color light emitting display panel in a state where the image magnification is adjusted.

FIG. 7A illustrates the alignment when an interval Q1 between the images of the sub-pixels of one of the colors (for example, the images 12R of the red sub-pixels) is adjusted to be two times as large as an interval P of the light receiving pixels 23, where Q1=N×P and N=2. The interval Q1 corresponds to an interval of the images of the pixels of the color light emitting display panel.

FIG. 7B illustrates the alignment when an interval Q2 between the images of the adjacent sub-pixels (for example, the image 12G of the green sub-pixel and the image 12B of the blue sub-pixel) is adjusted to be two times as large as an interval P of the light receiving pixels 23, where Q2=N×P and N=2. Such an alignment can be obtained by forming the image of each of the sub-pixels in a rectangular region having the same aspect ratio as that of the light receiving pixels 23, using an optical system in which image magnifications are different in the vertical and horizontal directions.

As such, when the alignment in which one of the intervals Q1 and Q2 is a natural multiple of the interval P is achieved, the measurement conditions (specifically, areas of the light receiving elements 23 on which each of the images of the sub-pixels is formed) for all the sub-pixels of each of the colors are identical. As a result, the error caused by influence of an aperture ratio when luminance of the sub-pixels of each of the colors is measured is eliminated.

In the measurement of luminance of a color light emitting display panel, a display pattern is displayed on the color light emitting display panel. The display pattern is a display pattern in which one of the sub-pixels included in a predetermined pixel produces a luminescence for each of the red, green, and blue colors and none of the sub-pixels included in at least one of the pixels adjacent to the predetermined pixel produces a luminescence.

FIGS. 8A to 8D illustrate examples of display patterns of the red sub-pixels of the color light emitting display panel.

Figure 8A:
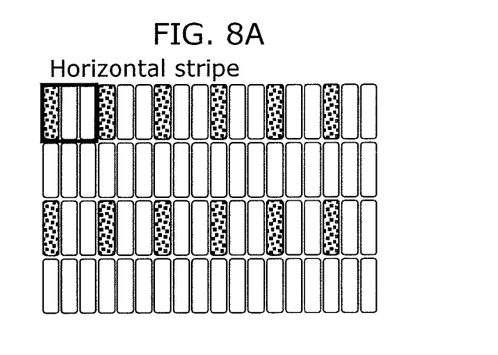
FIG. 8A illustrates an example of a display pattern of sub-pixels on a color light emitting display panel.

FIG. 8A is an example of a horizontal stripe pattern, and includes (i) the first display pattern in which only red sub-pixels included in the first pixels and arranged in the odd-numbered rows produce a luminescence and (ii) the second display pattern in which only red sub-pixels included in the second pixels and arranged in the even-numbered rows produce a luminescence. Such first and second display patterns are successively displayed on the color light emitting display panel to measure the luminance of all the red sub-pixels.

Furthermore, the first and second display patterns corresponding to each of the green sub-pixels and the blue sub-pixels are successively displayed on the color light emitting display panel to measure the luminance of the corresponding sub-pixels. As such, measurement of all the sub-pixels of all the colors is completed.

Figure 8B:
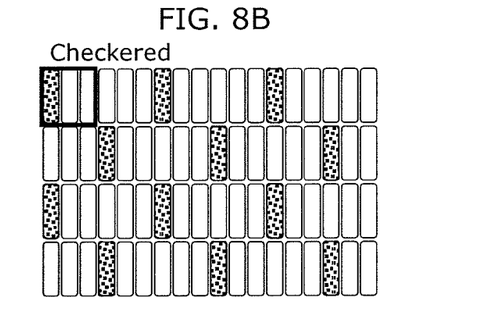
FIG. 8B illustrates an example of a display pattern of sub-pixels on a color light emitting display panel.

FIG. 8B is an example of a checkered pattern, and includes (i) the first display pattern in which only red sub-pixels included in the first pixels and arranged in the odd-numbered rows and columns or the even-numbered rows and columns produce a luminescence and (ii) the second display pattern in which only red sub-pixels included in the second pixels and arranged in the odd-numbered columns and the even-numbered rows or the even-numbered columns and the odd-numbered rows produce a luminescence. Such first and second display patterns are successively displayed on the color light emitting display panel to measure the luminance of all the red sub-pixels. Furthermore, the first and second display patterns corresponding to each of the green sub-pixels and the blue sub-pixels are successively displayed on the color light emitting display panel to measure the luminance of the corresponding sub-pixels.

Figure 8C:
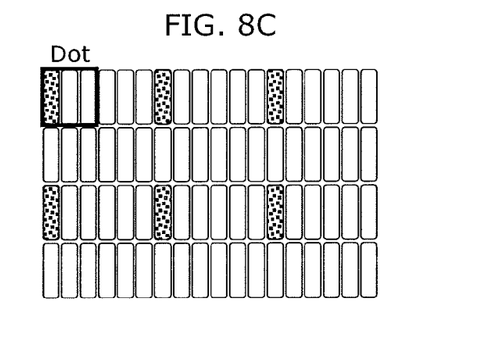
FIG. 8C illustrates an example of a display pattern of sub-pixels on a color light emitting display panel.

FIG. 8C is an example of a dot pattern, and includes: (i) the first display pattern in which only red sub-pixels included in the first pixels and arranged in the odd-numbered rows and columns produce a luminescence; (ii) the second display pattern in which only red sub-pixels included in the second pixels and arranged in the odd-numbered columns and the even-numbered rows produce a luminescence; (iii) the third display pattern in which only red sub-pixels included in the third pixels and arranged in the odd-numbered rows and the even-numbered columns produce a luminescence; and (iv) the fourth display pattern in which only red sub-pixels included in the fourth pixels and arranged in the even-numbered rows and columns produce a luminescence. Such first to fourth display patterns are successively displayed on the color light emitting display panel to measure the luminance of all the red sub-pixels. Furthermore, the first to fourth display patterns corresponding to each of the green sub-pixels and the blue sub-pixels are successively displayed on the color light emitting display panel to measure the luminance of the corresponding sub-pixels.

Figure 8D:
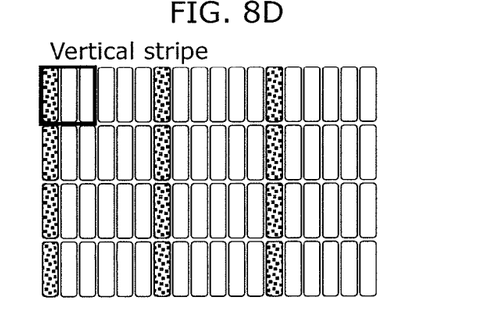
FIG. 8D illustrates an example of a display pattern of sub-pixels on a color light emitting display panel.

FIG. 8D is an example of a vertical stripe pattern, and includes (i) the first display pattern in which only red sub-pixels included in the first pixels and arranged in the odd-numbered columns produce a luminescence and (ii) the second display pattern in which only red sub-pixels included in the second pixels and arranged in the even-numbered columns produce a luminescence. Such first and second display patterns are successively displayed on the color light emitting display panel to measure the luminance of all the red sub-pixels. Furthermore, the first and second display patterns corresponding to each of the green sub-pixels and the blue sub-pixels are successively displayed on the color light emitting display panel to measure the luminance of the corresponding sub-pixels.

The luminance of the sub-pixels for each of the colors is calculated using the image data obtained by capturing an image of the color light emitting display panel on which a display pattern is displayed as described in Embodiment 1.

When the color of the sub-pixels for which the luminance is measured is switched to another color, the image magnification is desirably adjusted again. Accordingly, the magnification error caused by chromatic aberration of an optical system can be eliminated.

Furthermore, display patterns for a single-color display panel corresponding to the display patterns of the vertical stripe, checkered, dot, and horizontal stripe may be used for measuring luminance of pixels of the single-color display panel. For example, the display pattern in FIG. 5 according to Embodiment 1 is the dot pattern in FIG. 8C.

The method for measuring luminance of a light-emitting display panel is described hereinbefore based on Embodiments. The present disclosure is not limited to these Embodiments. Without departing from the scope of the present disclosure, the present disclosure includes an embodiment with some modifications on Embodiments 1 and 2 that are conceived by a person skilled in the art, and another embodiment obtained through combinations of the constituent elements of different Embodiments.

For example, although Embodiments describe adjustment of an image magnification using a zoom mechanism of a camera, an optical lens for adjusting the size of an image and the driving mechanism may be separately provided between the camera and the light-emitting display panel because the focal point of the camera is fixed.

Furthermore, when light-emitting display panels are upsized and simpler optical systems are used, an optimal alignment in which one of intervals of images of pixels is a natural multiple of one of intervals of light receiving pixels can sometimes be obtained only in a part of a region on the light receiving surface of the image sensor.

In such a case, luminance values of only pixels included in the part of the region on the light receiving surface of the image sensor in which the optimal alignment can be obtained are repeatedly measured by changing the image capturing positions. Accordingly, the luminance of all the pixels can be measured with higher accuracy. The region from which the optimal alignment can be obtained may be regarded as, for example, a light portion in the light-dark pattern caused by moire observed in adjustment of the image magnification.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The method for measuring luminance of a light-emitting display panel according to one or more exemplary embodiments disclosed herein is applicable to measurement of luminance of a light-emitting display panel, and in particular to inspection of, for example, organic EL display panels, liquid-crystal display panels, and plasma display panels.

The invention claimed is:

1. A method of measuring luminance of each of entire pixels two-dimensionally arranged in a light-emitting display panel at regular intervals, using an image sensor in which light receiving elements are two-dimensionally arranged at regular intervals, the method comprising:
    adjusting physical distances between the light-emitting display panel, the image sensor, and an optical lens, which is provided between the light-emitting display panel and the image sensor, by setting intervals of images of the entire pixels to be N times as large as intervals of the light receiving pixels, where N is a natural number, the images formed on a light receiving surface of the image sensor through the optical lens;
    displaying, on the light-emitting display panel, a display pattern in which predetermined pixels from the entire pixels produce a luminescence; and
    measuring the luminance of the predetermined pixels that produce the luminescence, using the light receiving elements,
    wherein, in the adjusting of the physical distances between the light-emitting display panel, the image sensor, and the optical lens, in response to moire observed in a captured image, magnification is changed by physically changing at least a position of the optical lens by a zoom mechanism to adjust the physical distances between the light-emitting display panel, the image sensor, and the optical lens until moire is not observed,
    in the displaying, the display pattern is a display pattern in which the predetermined pixels produce the luminescence and at least one of the entire pixels adjacent to the predetermined pixels does not produce a luminescence, and
    in the measuring, the luminance of each of the predetermined pixels is measured using $(2N)^2$ light receiving elements included in the light receiving elements.

2. The method according to claim 1,
    wherein the entire pixels are arranged in a matrix in the light-emitting display panel, and
    only one of four pixels included in the entire pixels produces a luminescence in the display pattern, the four pixels being a first pixel arranged in an odd-numbered row and an odd-numbered column, a second pixel arranged in an even-numbered row and an odd-numbered column, a third pixel arranged in an odd-numbered row and an even-numbered column, and a fourth pixel arranged in an even-numbered row and an even-numbered column.

3. The method according to claim 1,
    wherein the entire pixels are arranged in a matrix in the light-emitting display panel, and
    only one of two pixels included in the entire pixels produces a luminescence in the display pattern, the two pixels being a first pixel arranged in an odd-numbered row and a second pixel arranged in an even-numbered row.

4. The method according to claim 1,
    wherein the entire pixels are arranged in a matrix in the light-emitting display panel, and
    only one of two pixels included in the entire pixels produces a luminescence in the display pattern, the two pixels being a first pixel arranged in an odd-numbered row and an odd-numbered column or an even-numbered row and an even-numbered column, and a second pixel arranged in an even-numbered row and an odd-numbered column or an odd-numbered row and an even-numbered column.

5. The method according to claim 1,
wherein the entire pixels are arranged in a matrix in the light-emitting display panel, and
only one of two pixels included in the entire pixels produces a luminescence in the display pattern, the two pixels being a first pixel arranged in an odd-numbered column and a second pixel arranged in an even-numbered column.

6. The method according to claim 1,
wherein N is one of 2, 3, and 4.

7. The method according to claim 1,
wherein each of the entire pixels includes a red sub-pixel, a green sub-pixel, and a blue sub-pixel, and
in the displaying, one of the red sub-pixel, the green sub-pixel, and the blue sub-pixel produces a luminescence.

8. The method according to claim 1,
wherein the image sensor is a charge-coupled device.

9. The method according to claim 8,
wherein the image sensor has an aperture ratio of 20% or higher and lower than 100%.

10. The method according to claim 1,
wherein the entire pixels include an organic electroluminescence (EL) element.

11. A method of measuring luminance of each of entire pixels two-dimensionally arranged in a light-emitting display panel at regular intervals, using an image sensor in which light receiving elements are two-dimensionally arranged at regular intervals, the method comprising:
adjusting physical distances between the light-emitting display panel, the image sensor, and an optical lens, which is provided between the light-emitting display panel and the image sensor, by setting intervals of images of the entire pixels to be N times as large as intervals of the light receiving pixels, where N is a natural number, the images formed on a light receiving surface of the image sensor through the optical lens;
displaying, on the light-emitting display panel, a display pattern in which predetermined pixels from the entire pixels produce a luminescence; and
measuring the luminance of the predetermined pixels that produce the luminescence, using the light receiving elements,
wherein, in the adjusting of the physical distances between the light-emitting display panel, the image sensor, and the optical lens, in response to moire observed in a captured image, magnification is changed by physically changing at least a position of the optical lens by a zoom mechanism to adjust the physical distances between the light-emitting display panel, the image sensor, and the optical lens until moire is not observed, and
in the displaying, the display pattern is a display pattern in which the predetermined pixels produce the luminescence and at least one of the entire pixels adjacent to the predetermined pixels does not produce a luminescence.

12. A method of measuring luminance of each of entire pixels two-dimensionally arranged in a light-emitting display panel at regular intervals, using an image sensor in which light receiving elements are two-dimensionally arranged at regular intervals, the method comprising:
adjusting physical distances between the light-emitting display panel, the image sensor, and an optical lens, which is provided between the light-emitting display panel and the image sensor, by setting intervals of images of the entire pixels to be N times as large as intervals of the light receiving pixels, where N is a natural number, the images formed on a light receiving surface of the image sensor through the optical lens;
displaying, on the light-emitting display panel, a display pattern in which predetermined pixels from the entire pixels produce a luminescence; and
measuring the luminance of the predetermined pixels that produce the luminescence, using the light receiving elements,
wherein, the adjusting of the physical distances between the light-emitting display panel, the image sensor, and the optical lens, comprises:
coarsely adjusting the intervals of the images of the pixels to be approximately N times as large as the intervals of the light receiving pixels; and
after the coarse adjusting, finely adjusting the intervals of the images of the pixels in response to moire observed in a captured image, magnification is changed by physically changing at least a position of the optical lens by a zoom mechanism to adjust the physical distances between the light-emitting display panel, the image sensor, and the optical lens until moire is not observed, and
in the displaying, the display pattern is a display pattern in which the predetermined pixels produce the luminescence and at least one of the entire pixels adjacent to the predetermined pixels does not produce a luminescence.

* * * * *